(12) United States Patent
Wells et al.

(10) Patent No.: US 8,414,228 B2
(45) Date of Patent: Apr. 9, 2013

(54) ROTARY CUTTING TOOL

(75) Inventors: Jason W. Wells, York, SC (US); Paul S. Daniels, Atwater, OH (US); Douglas P. Bonfiglio, Clinton, OH (US); Jeffery L. Burton, Kent, OH (US)

(73) Assignee: SGS Tool Company, Monroe Falls, OH (US)

( * ) Notice: Subject to any disclaimer, the term of this patent is extended or adjusted under 35 U.S.C. 154(b) by 394 days.

(21) Appl. No.: 12/876,538

(22) Filed: Sep. 7, 2010

(65) Prior Publication Data

US 2011/0217132 A1    Sep. 8, 2011

Related U.S. Application Data

(63) Continuation-in-part of application No. 11/953,748, filed on Dec. 10, 2007, now Pat. No. 7,789,597, which is a continuation of application No. 11/420,874, filed on May 30, 2006, now Pat. No. 7,306, 408.

(60) Provisional application No. 60/766,241, filed on Jan. 4, 2006.

(51) Int. Cl.
*B23C 5/10* (2006.01)
*B23P 15/34* (2006.01)

(52) U.S. Cl.
USPC ............................................. 407/54; 407/61

(58) Field of Classification Search .................... 407/53, 407/54, 55, 56, 59, 60, 61, 63
See application file for complete search history.

(56) References Cited

U.S. PATENT DOCUMENTS

| | | | | |
|---|---|---|---|---|
| 4,963,059 | A * | 10/1990 | Hiyama | 407/60 |
| 6,179,528 | B1 * | 1/2001 | Wardell | 407/54 |
| 7,223,053 | B2 * | 5/2007 | Flynn | 407/53 |
| 7,789,597 | B2 * | 9/2010 | Wells et al. | 407/53 |
| 2004/0120777 | A1 | 6/2004 | Noland | |

FOREIGN PATENT DOCUMENTS

| | | |
|---|---|---|
| DE | 29715192 U1 | 12/1997 |
| DE | 10325600 A1 | 1/2005 |
| DE | 102005002698 A1 | 7/2006 |

* cited by examiner

*Primary Examiner* — Will Fridie, Jr.
(74) *Attorney, Agent, or Firm* — Hahn, Loeser & Parks, LLP

(57) ABSTRACT

A rotary cutting tool or end mill is provided, the tool comprising a plurality of pairs of diametrically-opposed, symmetrical, helical flutes formed in a cutting portion of the tool body, wherein the pitch between at least one pair of adjacent helical flutes is less than or greater than the pitch of at least one other pair of adjacent helical flutes in at least one radial plane along the axial length of the flutes, a plurality of peripheral cutting edges, wherein at least one of the peripheral cutting edges has a radial rake angle different from radial rake angle of a peripheral cutting edge of a different helical flute.

20 Claims, 13 Drawing Sheets

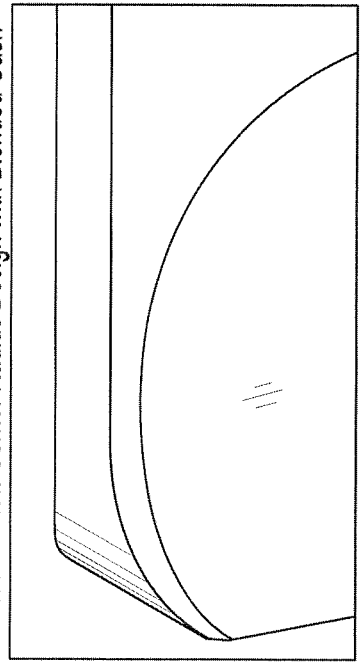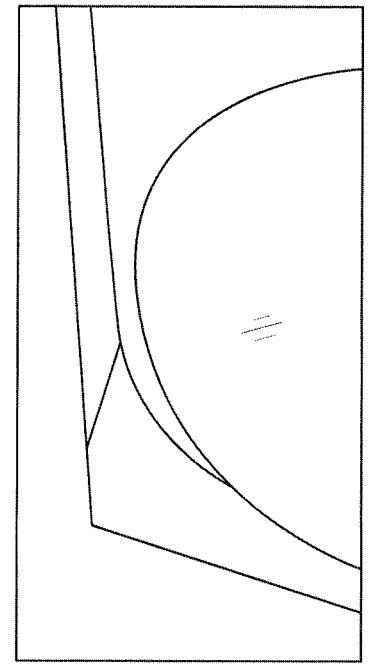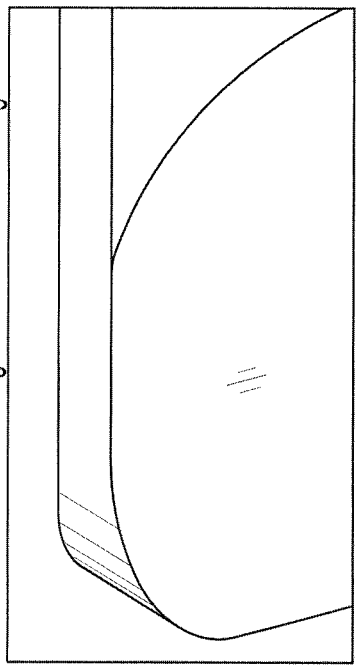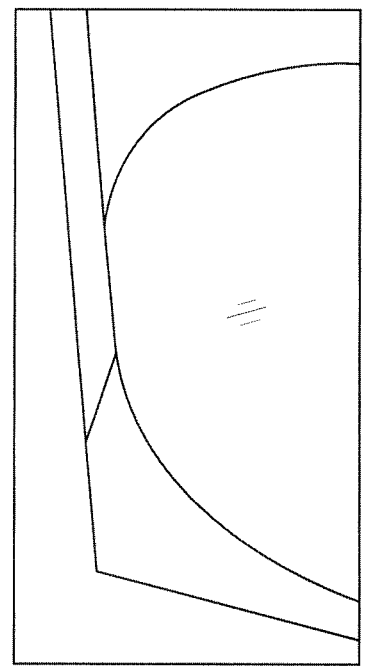

ROTARY CUTTING TOOL

This application is a continuation-in-part of U.S. patent application Ser. No. 11/953,748 filed Dec. 10, 2007, which issued on Sep. 7, 2010 as U.S. Pat. No. 7,789,597, which is a continuation of U.S. patent application Ser. No. 11/420,874 filed May 30, 2006, which issued on Dec. 11, 2007 as U.S. Pat. No. 7,306,408, which claims priority of U.S. Provisional Application No. 60/766,241 filed Jan. 4, 2006, each of which are hereby incorporated by reference.

BACKGROUND AND SUMMARY

The present invention relates to a rotary cutting tool, and more particularly to an end mill having a plurality of pairs of diametrically-opposed, symmetrical, helical flutes, wherein the pitch between at least one pair of adjacent helical flutes is less than or greater than the pitch of at least one other pair of adjacent helical flutes in at least one radial plane along the axial length of the flutes, a plurality of peripheral cutting edges associated with the plurality of the helical flutes wherein at least one of the peripheral cutting edges has a radial rake angle different from radial rake angle of a peripheral cutting edge of a different helical flute. The improved end mill provides reduced chatter, improved surface finish, and other additional benefits.

Rotational end mills have long been utilized for various cutting duties. Conventionally, these end-mills are constructed with different types of hardened steel as well as tungsten carbide, and are often given additional structural features such as a corner radius at the cutting ends, tapered cutting ends, ball shaped cutting ends, uneven cutting edges for rough milling operations including serrations and still other edge contours. Likewise, these end-mills can be provided for longer wear with wear-resistant PVD and CVD coatings including amorphous diamond and various nitride compositions.

A common problem encountered in the use of end mills is "chatter". When cutting ferrous and non-ferrous materials, especially at aggressive cutting feed rates, harmonics can generate regenerative vibration whereby the rotating end mill's frequency of vibration self-excites. The self-exciting chatter is usually accompanied by a loud and excessive noise while machining. One cause of this chatter is when the peripheral cutting edges formed along the helix are spaced at equal distances about the end mill such that the time between the cutting edges hitting the material being cut is the same (or even worse, in a concave radial cut when more than one cutting edge hits the material being cut at the same time and at the same intervals). Excessive chatter can result in a poor surface finish, rework or scrap of the work product. Chatter can damage the cutting edge of an end mill and limit its useful life, thereby increasing costs for the milling operation and generating less precise machined parts than may be desired or required for a particular final function. Excessive chatter can also cause premature wear to the actual milling machine and its components.

In order to combat the harmonics, variable helix end mills and variable pitch end mills have been developed. A variable helix end mill is generally an end mill having helical flutes in which the circumferential distance between the peripheral cutting edges varies in an axial direction along the end mill. The circumferential distance is also sometimes described as an angle between adjacent peripheral cutting edges known as the index angle or pitch. One type of variable helix end mill is when adjacent helical flutes have different helix angles. Another type is when the helical flutes have different variable helix angles (i.e. the helix angle of one flute is 40 degrees at the leading end of the flute and 35 degrees on the trailing end of the flute). The other type of end mill discussed is the variable pitch end mills. One type of variable pitch end mill is when all helical flutes have the same helix angle with the flute indexing altered from the typical 90 degree spacing. Unlike the variable helix end mills, the circumferential distance between adjacent peripheral cutting edges of a variable pitch end mill typically is constant in the axial direction of the end mill.

One of the most commercially successful variable helix end mills is the Z-Carb® end mill manufactured under U.S. Pat. No. 4,963,059, and owned by the Applicant. The U.S. Pat. No. 4,963,059 disclosed an end mill having a plurality of paired helical flutes forming an even number of helical peripheral cutting edges equally spaced circumferentially in one plane wherein the peripheral cutting edges are formed as a plurality of pairs of diametrically opposite cutting edges having the same helix angle and thereby being symmetrical with respect to the axis of the body. While the Z-Carb® end mill is resistant to chatter and provides a good surface finish, the technology is over 20 years old and it is believed that there is still room for improvement.

Many manufacturers of end mills have attempted to employ different strategies for reducing harmonics. One such attempt is described in US Published Patent Application US2004/0120777, which teaches an end mill having a plurality of flutes wherein each feature of the flute is unsymmetrical with each other flute including location of the flute about the tool (index angle), helix angle, radial rake angle, and radial relief angle. It would seem to follow that a tool having everything different would be the best performer in terms of the reduction of chatter, however, testing of these tools have shown a decrease in performance in comparison to other leading end mills. An end mill having all different features can have stability problems that may be even worse than the problems with chatter. Another problem with such tools is that the production and resharpening of the tool is difficult because all of the features of the end mill are different.

Another attempt to reduce harmonics and increase performance is taught in U.S. Pat. No. 6,997,651, entitled End Mill Having Different Axial Rake Angles and Different Radial Rake Angles. This prior art end mill has a plurality of flutes all having the same helix angle and being equally spaced about the circumference of the tool (same index angle), but having at least two different radial rake angles and at least two different axial rake angles. Like the other prior art end mill discuss above, the testing of this tools has shown a decrease in performance in comparison to other leading end mills, including in the reduction of harmonics. The performance of this end mill will be discussed in greater detail below.

Many other attempts have been made in the prior art to improve the performance of end mills with regards to chatter. The reduction of harmonics is not accomplished by making all features different in a random manner as this may have serious adverse consequences with the performance of the tool. Accordingly, there remains room for improvement in the prior art to reduce chatter without sacrificing stability of the tool.

The present invention overcomes at least one disadvantage of the prior art by providing A rotary cutting tool comprising: a body having a cutting portion and a shank portion; a plurality of pairs of diametrically-opposed, symmetrical, helical flutes formed in the cutting portion of the body, wherein the pitch between at least one pair of adjacent helical flutes is less than or greater than the pitch of at least one other pair of adjacent helical flutes in at least one radial plane along the axial length of the flutes; a plurality of peripheral cutting edges associated with the plurality of the helical flutes; wherein at least one of the peripheral cutting edges has a radial rake angle different from radial rake angle of a peripheral cutting edge of a different helical flute.

Still another embodiment of the invention overcomes at least one disadvantage of the prior art by providing a rotary cutting tool comprising: a body having a cutting portion and a shank portion; a plurality of pairs of diametrically-opposed, symmetrical, helical flutes formed in the cutting portion of the body, at least one flute being formed at a constant helix angle, the pitch between adjacent helical flutes being variable along the axial length of the flutes, and the pitch between all of the helical flutes being equivalent in at least one radial plane of the cutting portion of the body; a plurality of peripheral cutting edges, the peripheral cutting edges formed along an intersection of a circumferential surface of the cutting portion of the body and a portion of an inner surface of a respective one of the helical flutes facing in a direction of rotation of the body; wherein at least one of the peripheral cutting edges has a radial rake angle different from radial rake angle of a peripheral cutting edge of a different helical flute; wherein within each of the pairs of diametrically-opposed, symmetrical, helical flutes: the radial rake angle of one of the peripheral cutting edges of a pair of flutes is equivalent to the radial rake angle of the other peripheral cutting edge of said pair of flutes; wherein the radial rake angle of at least one of the peripheral cutting edges is constant along the length of the helical flute forming the peripheral cutting edge; and wherein all of the peripheral cutting edges have a positive radial rake angle.

BRIEF DESCRIPTION OF THE DRAWINGS

FIG. 22 is an enlarged perspective view of a portion of a rotary cutting tool according to one embodiment without a gash blend.

FIG. 23 is a view of a tool similar to FIG. 22 except according to an embodiment with a gash blend.

FIG. 24 is an enlarged perspective view of a portion of a rotary cutting tool according to another embodiment without a gash blend FIG. 25 is a view of a tool similar to FIG. 24 except according to an embodiment with a gash blend.

DETAILED DESCRIPTION OF THE DRAWINGS

Figure 1:
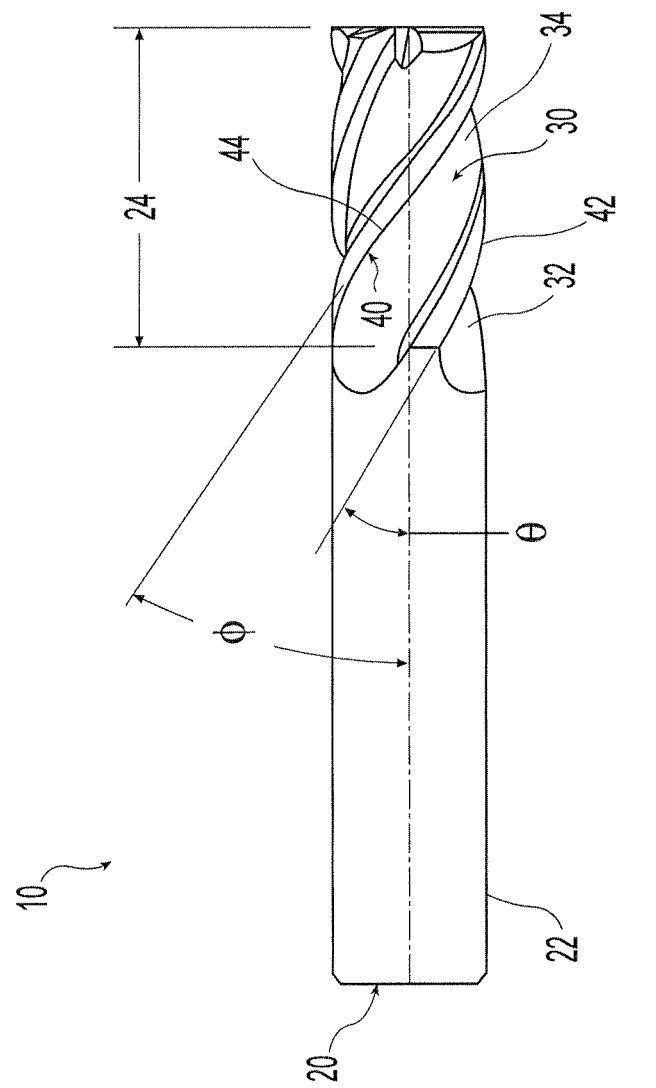
FIG. 1 is a side elevational view of a rotary cutting tool cutting tool in accordance with the present invention.

Referring now to FIG. 1, an embodiment of the rotary cutting tool or end mill 10 of the present invention is shown comprising a generally cylindrical body 20 having a shank 22 and a cutting portion 24. The cutting portion 24, also representing the length of cut of the end mill, includes a plurality of flutes 30 formed as pairs of diametrically-opposed, symmetrical, helical flutes 32, 34 formed in the body 20. The flutes 30 of the cutting portion 24 are of the variable helix type such that the pitch, or index angle, between adjacent helical flutes 30 is variable along the axial length of the flutes 30. In the particular embodiment shown, a four flute end mill is shown wherein the first pair of diametrically-opposed, symmetrical, helical flutes 32 are formed at a constant helix angle θ of thirty-five degrees and the second pair of diametrically-opposed, symmetrical, helical flutes 34 are formed at a constant helix angle φ of thirty-eight degrees. The invention is not limited to these particular helix angles nor is it limited to constant helix angles as shown in this embodiment and variable helix angles helices are also contemplated.

The end mill 10 further comprises a plurality of peripheral cutting edges 40, the peripheral cutting edges 40 are formed along an intersection of a circumferential surface, or land, of the cylindrical body 20 and an inner surface of a respective one of the helical flutes 30 facing in a direction of rotation of the body 20. Referring to the cross-sectional view of FIG. 2, the first pair of diametrically-opposed, symmetrical, helical flutes 32 have diametrically-opposed, peripheral cutting edges 42 and the second pair of diametrically-opposed, symmetrical, helical flutes 34 have diametrically-opposed, peripheral cutting edges 44. As mentioned above, the pitch or index angles, designated γ, ϵ vary in the axial direction and in the cross-section are shown as non-ninety degree angles. In the embodiment shown, γ is equivalent to ninety-three degrees and ϵ is equivalent to eighty-seven degrees. Although not shown in cross-section, the pitch or helix angles γ, ϵ may be equal in a single radial plane along the length of cut 24. In one embodiment, the radial plane of equal index angles is through the midpoint 26 of the length of cut 24. Although two pairs of diametrically opposed, peripheral cutting edges 42, 44 are shown, it is contemplated that more pairs could be used in other end mill embodiments.

Figure 3:
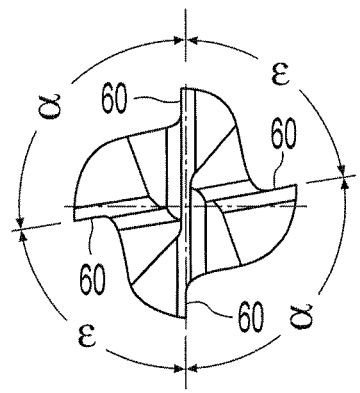
FIG. 3 is a cutting end view of the rotary cutting tool of FIG. 1.

Referring to FIG. 3, a cutting end view of the end mill 10 is shown. The cutting end comprises a plurality of end cutting edges 60 located on an axial distal end of the body 20 and contiguous with a corresponding one of the plurality of peripheral cutting edges 40. Like the spacing of the peripheral cutting edges 40, the index angles γ, ϵ are shown as non-ninety degree angles. The end cutting edges 60 all have an equivalent axial rake angle.

Figure 4:
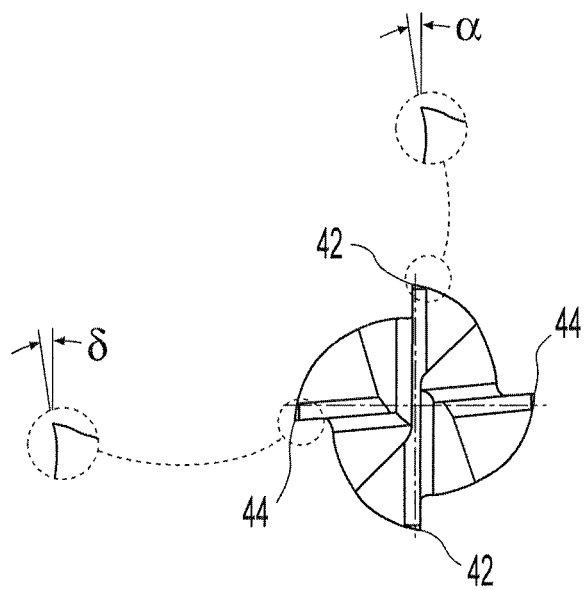
FIG. 4 is a cutting end view of the rotary cutting tool of FIG. 1 with additional detail views of the peripheral cutting edges of an embodiment of the present invention.

As best shown in FIG. 4, the peripheral cutting edges 42 of the first pair of diametrically-opposed, symmetrical, helical flutes 32, each have a radial rake angle α, while the peripheral cutting edges 44 of the second pair of diametrically-opposed, symmetrical, helical flutes 34 each have a radial rake angle δ. In the embodiment of FIG. 4, radial rake angle α is different from radial rake angle δ, and more particularly, radial rake angle α is three degrees and radial rake angle δ is seven degrees.

Figure 5:
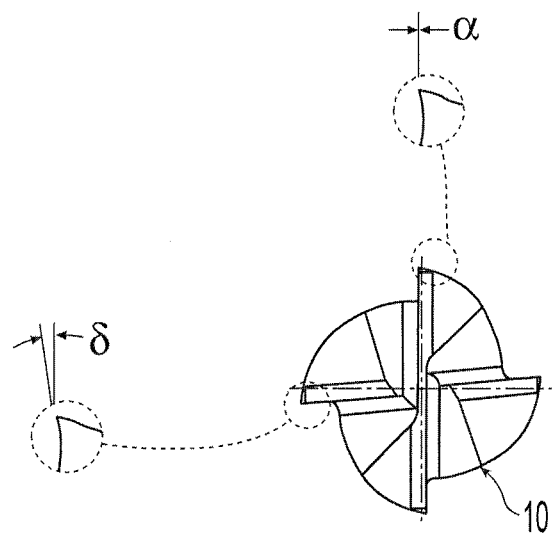
FIG. 5 is a cutting end view of a rotary cutting tool having additional detail views of the peripheral cutting edges of an embodiment of the present invention.

In the embodiment of FIG. 5, radial rake angle α is neutral while radial rake angle δ is positive, and more particularly, radial rake angle α is zero degrees and radial rake angle δ is seven degrees.

Figure 6:
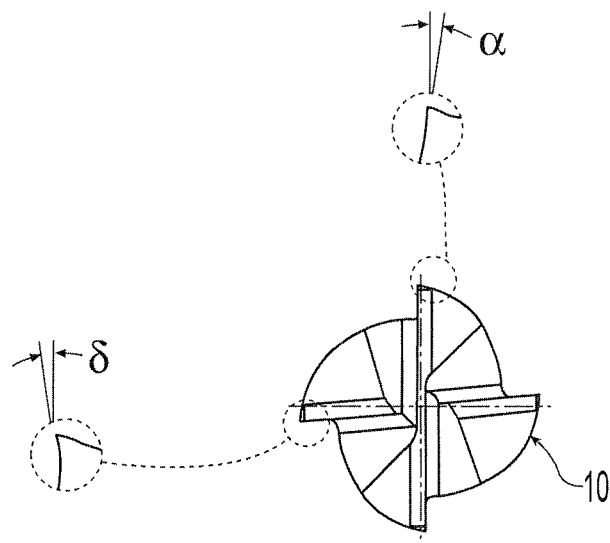
FIG. 6 is a cutting end view of a rotary cutting tool having additional detail views of the peripheral cutting edges of an embodiment of the present invention.

In the embodiment of FIG. 6, radial rake angle α is negative while radial rake angle δ is positive, and more particularly, radial rake angle α is negative seven degrees and radial rake angle δ is positive seven degrees.

Figure 7:
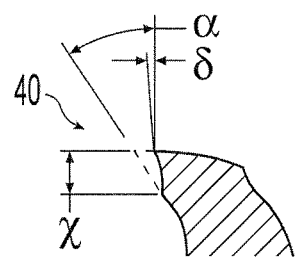
FIG. 7 is a detail cross-sectional view of a peripheral cutting edge of an embodiment of a rotary cutting tool of the present invention showing a K-land.

In another embodiment represented by the cross-section of FIG. 7, the radial rake is initially formed as a positive rake angle α, then on at least one peripheral cutting edge is formed with a radial rake angle δ is formed as a K-land of width X such that as shown, radial rake angle α is positive eight degrees and radial rake angle δ is positive three degrees. It is contemplated that any or all of the peripheral cutting edges 40 can be formed as K-lands.

Figure 8:
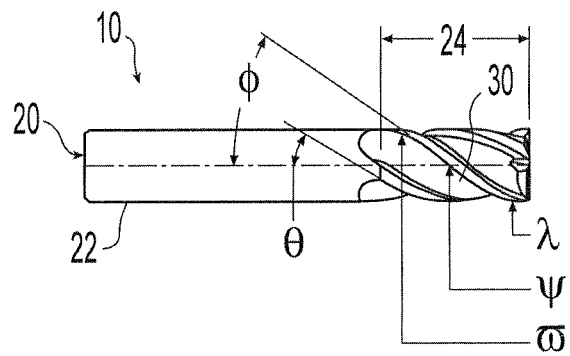
FIG. 8 is a side elevational view of a rotary cutting tool cutting tool in accordance with another embodiment of the present invention showing variable rake angles along a single helix.

Referring now to FIG. 8, at least one of the helical flutes 30 is shown having radial rake angles that vary in the axial direction of the flute 30. Radial rake angle λ is shown toward the leading end of the flute 30, radial rake angle ψ is shown at the midpoint of the flute 30, and radial rake angle ω is shown toward the trailing end of the flute 30. In the embodiment shown, radial rake angle λ is three degrees, radial rake angle ψ is five degrees, and radial rake angle ω is eight degrees. The present invention is not limited to the embodiment shown and it is contemplated that any rake angle that varies in the axial direction of the flute is contemplated. For example, the radial rake angle in the axial direction of the flute may vary from negative, through neutral, and back to positive. Another example is that the radial rake angle in the axial direction of the flute may vary in different negative amounts.

Figure 9:
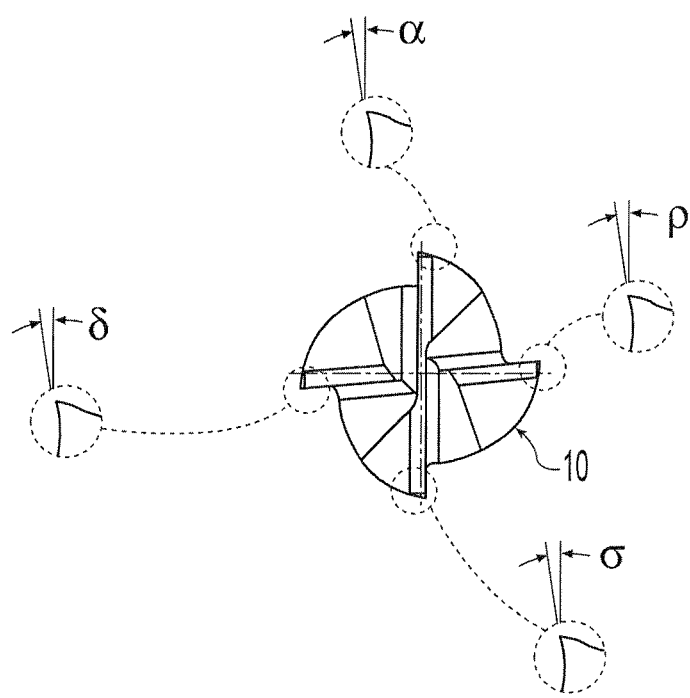
FIG. 9 is an end view of an embodiment of another embodiment of the present invention having all different radial rake angles.

In another embodiment of the invention as best shown in FIG. 9, the radial rake angles are all different. Accordingly, peripheral cutting edges 42 of the first pair of diametrically-opposed, symmetrical, helical flutes 32, have different radial rake angles α, σ, while the peripheral cutting edges 44 of the second pair of diametrically-opposed, symmetrical, helical flutes 34 have different radial rake angle δ, ρ. In the embodiment of FIG. 9, radial rake angle α is three degrees, radial rake angle δ is three degrees, radial rake angle σ is nine degrees, and radial rake angle σ is seven degrees. However, the invention is not limited to these values as the radial rake angles α, σ, δ, ρ can be any combination of positive, neutral, and negative rake angles. In a variation of this embodiment, the rake angles of diametrically opposing peripheral cutting edges are different, i.e. radial rake angles α≠σ and δ≠ρ whereas α may equal δ and/or ρ; or σ may equal δ and/or ρ.

Figure 2:
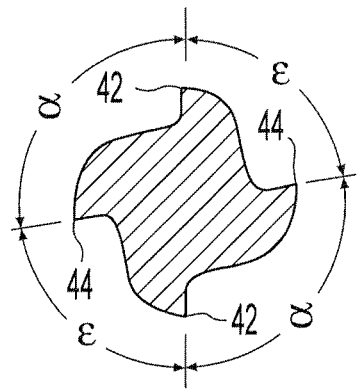
FIG. 2 is a cross-sectional view of the rotary cutting tool of FIG. 1.
Figure 10:
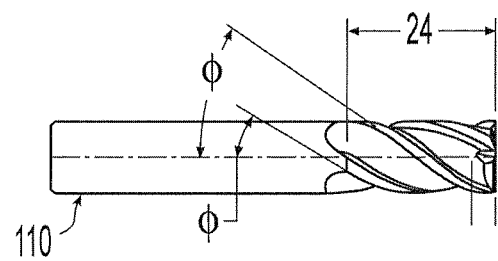
FIG. 10 is a side elevational view of a variable pitch rotary cutting tool cutting tool in accordance with another embodiment of the present invention having equal helix angles.

Referring now to FIG. 10, a variable pitch end mill 110 is shown. The helix angles ϕ of the end mill are all equivalent. Due to the positioning of the helix angles ϕ, the pitch ϵ, γ of adjacent cutting edges 42, 44 varies as best shown in FIGS. 2 and 3. However, unlike the variable helix end mills 10, the pitch ϵ, γ does not change along the axial length of the end mill. The radial rake angles discussed above with relation to the variable helix end mills are applied to the variable pitch end mill 110 in the same manner.

Figure 11:
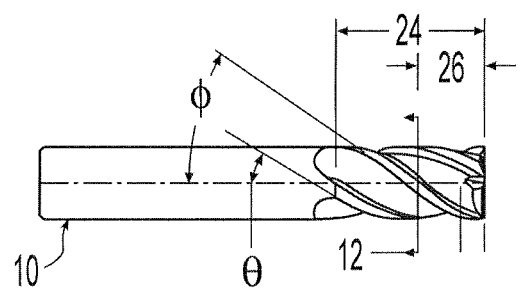
FIG. 11 is a side elevational view of a rotary cutting tool cutting tool in accordance with another embodiment of the present invention.
Figure 12:
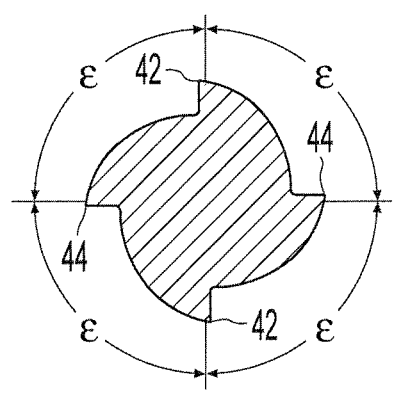
FIG. 12 is a cross-sectional view of the rotary cutting tool of FIG. 11 taken at the midpoint of the length of cut.

FIGS. 11 and 12 show the present invention applied to variable helix end mill 10 wherein the pitch or index angles ϵ are equivalent in one radial plane along the length of cut. In the embodiment shown, the one radial plane is at the midpoint 26 of the length of cut 24. The radial rake angles discussed above with relation to the variable helix end mills and variable pitch end mills 110 are applied to the variable helix end mill 10 of FIGS. 11 and 12 in the same manner.

The different radial rake angles of the present α, δ, σ, ρ, or λ, ψ, ω may be formed on adjacent or opposite peripheral cutting edges. Conversely, the same radial rake angles may be formed on adjacent or opposite peripheral cutting edges.

EXAMPLES

Testing in the form of a sound comparison and a surface finish comparison were conducted to compare the end mill of the present invention with a standard variable helix Z-Carb® end mill and also an end mill made in accordance with U.S. Pat. No. 6,997,651 having different axial rake angles and different radial rake angles, but with equal index angles and helix angles. The three end mills each were made of cemented carbide and having four flutes and a tool diameter of 0.5 inch. A chart comparison of radial rake angles and helix angles is shown below and identified by position on a four flute end mill:

| SGS Z-Carb | | | |
|---|---|---|---|
| | Rake | Helix | |
| Tooth No. 1 | 7° | 35° | Center Cutting |
| Tooth No. 2 | 7° | 38° | Non-Center Cutting |
| Tooth No. 3 | 7° | 35° | Center Cutting |
| Tooth No. 4 | 7° | 38° | Non-Center Cutting |

| present invention | | | |
|---|---|---|---|
| | Rake | Helix | |
| Tooth No. 1 | 3° | 35° | Center Cutting |
| Tooth No. 2 | 8° | 38° | Non-Center Cutting |
| Tooth No. 3 | 3° | 35° | Center Cutting |
| Tooth No. 4 | 8° | 38° | Non-Center Cutting |

| 6,997,651 | | | |
|---|---|---|---|
| | Rake | Helix | |
| Tooth No. 1 | 6° | 40° | Center Cutting |
| Tooth No. 2 | 15° | 40° | Non-Center Cutting |
| Tooth No. 3 | 6° | 40° | Center Cutting |
| Tooth No. 4 | 15° | 40° | Non-Center Cutting |

Figure 13:
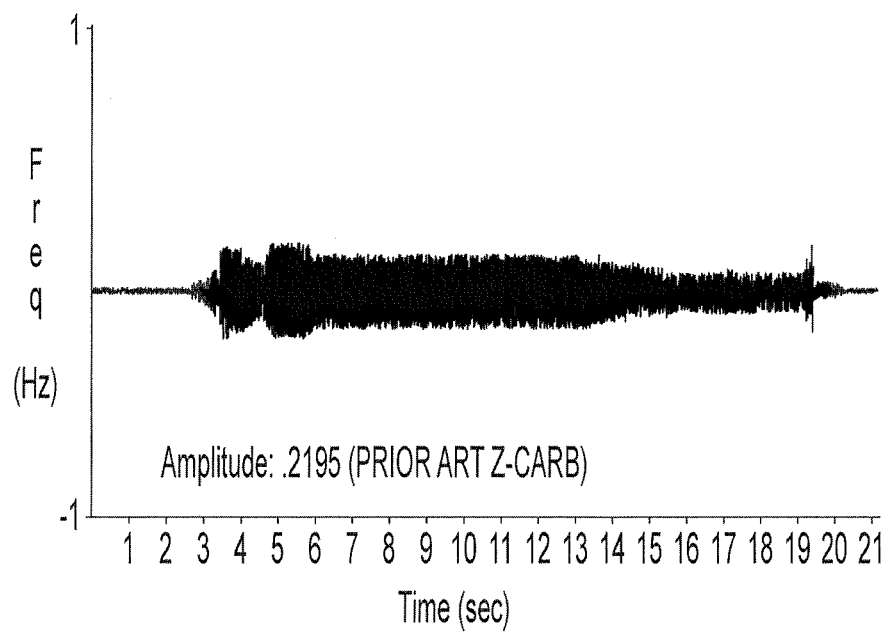
FIG. 13 is a graph of a sound measurement taken during a cut made using a prior art Z-Carb® end mill.
Figure 14:
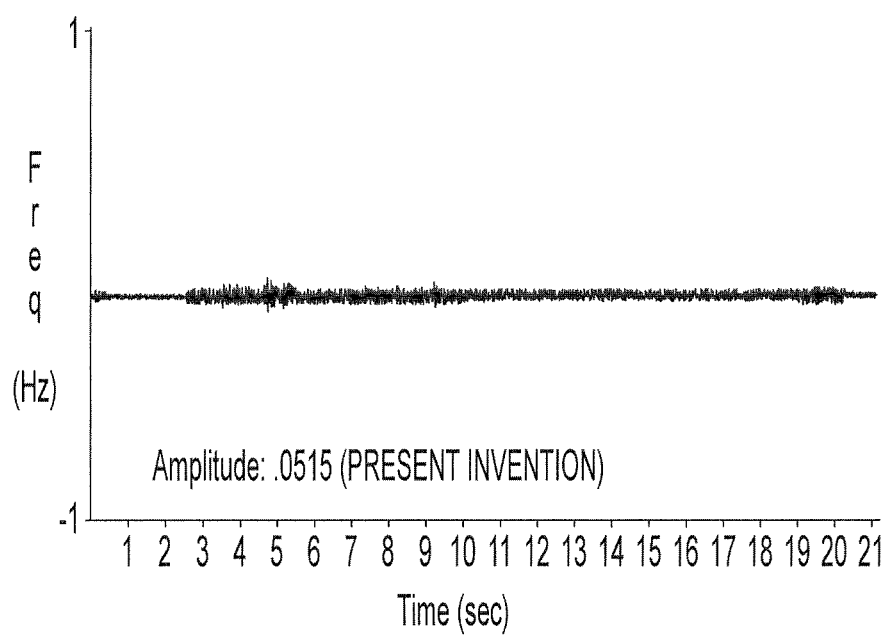
FIG. 14 is a graph of a sound measurement taken during a cut made using a rotary cutting tool in accordance with one embodiment of the present invention.
Figure 15:
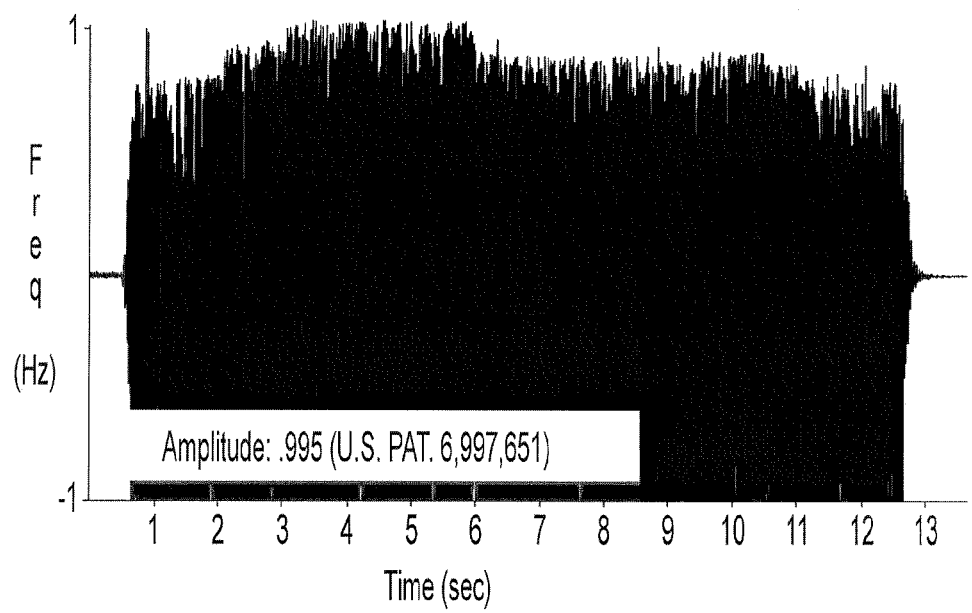
FIG. 15 is a graph of a sound measurement taken during a cut made using an end mill made in accordance with U.S. Pat. No. 6,997,651.
Figure 16:
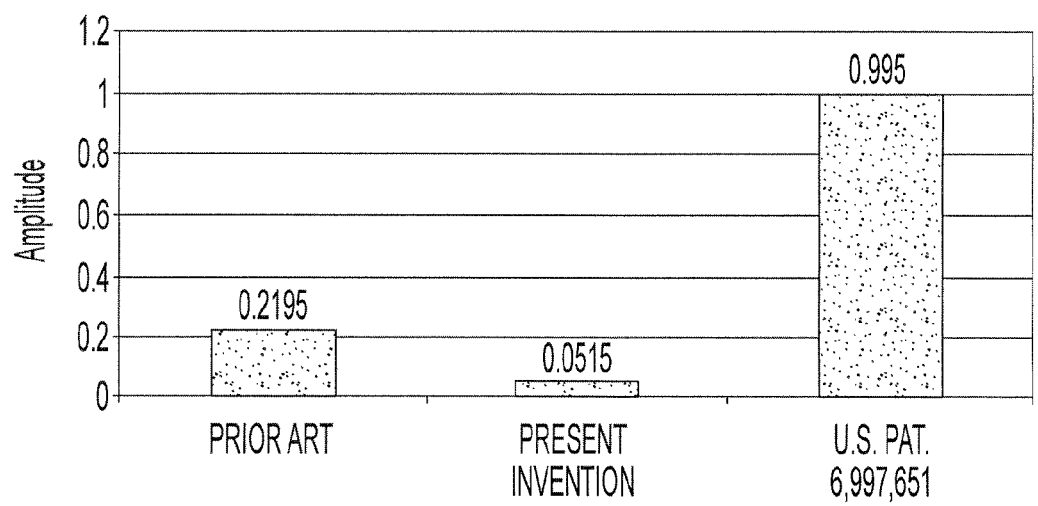
FIG. 16 is a chart showing a comparison of the sound measurements of the tools of FIGS. 13-15.
Figure 17:
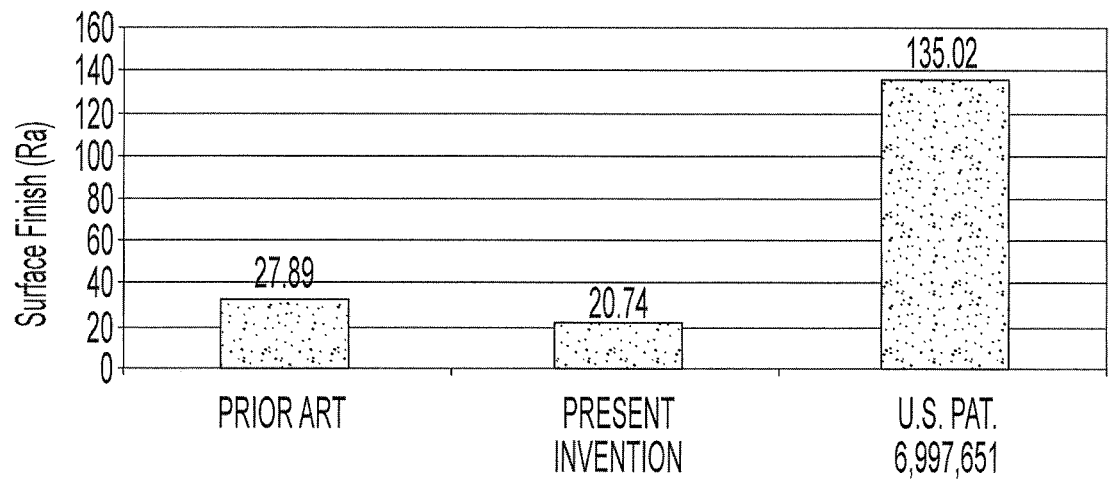
FIG. 17 is a chart showing a comparison of the surface measurements of the tools of FIGS. 13-15.

For the initial sound/surface finish comparison, the end mills were used to cut a 0.5 inch deep slot in 4140 steel having a hardness of 28 HRc at a rotational speed of 2675 rpm and a feed rate of 18 inches per minute. The results for each tool are shown in FIGS. 13-15 and a comparison graph is shown in FIG. 16. The results show that the amplitude of noise created by the U.S. Pat. No. 6,997,651 having different axial rake angles and different radial rake angles, but with equal index angles and helix angles is over 18 times that of the end mill of the present invention. The results show that the amplitude of noise created by the standard variable helix Z-Carb® end mill is over 4 times that of the end mill of the present invention. The noise generated during a cut is often indicative of the quality of surface finish that will be achieved by the cut. Referring now to FIG. 17, the surface finish measurements are compared on a graph. The results show that the surface finish of end mill of U.S. Pat. No. 6,997,651 have a surface finish that was 5.5 times rougher than the surface finish provided by the end mill of the present invention. The prior art Z-Carb® end mill at a service finish that was 34% rougher than the end mill of the present invention.

Figure 18:
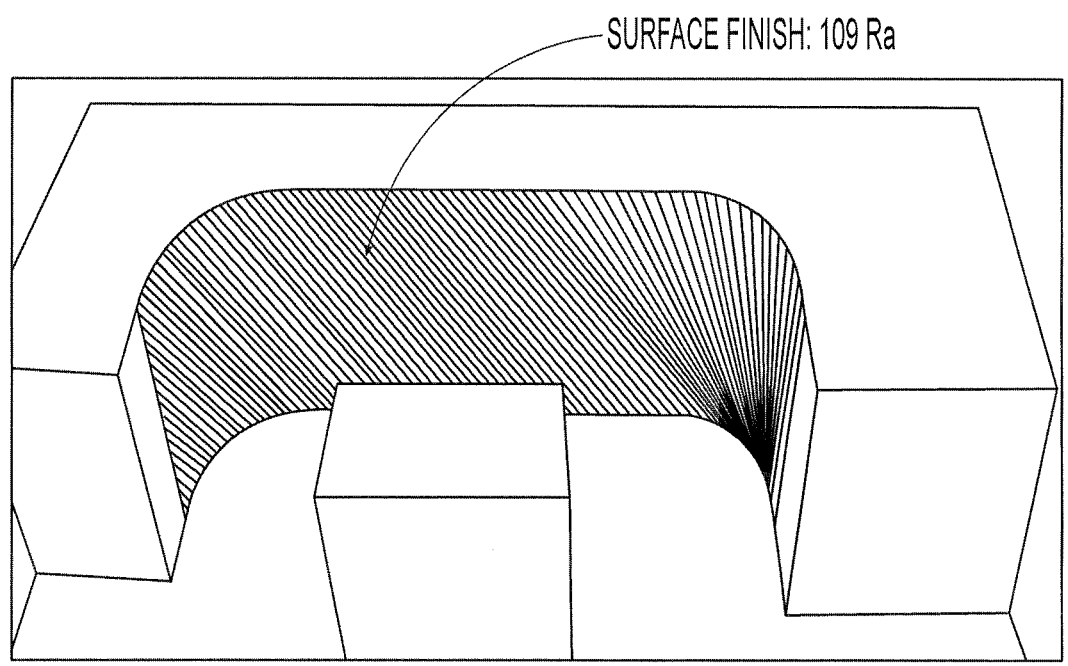
FIG. 18 is a picture showing an actual cut made using a prior art Z-Carb® end mill.
Figure 19:
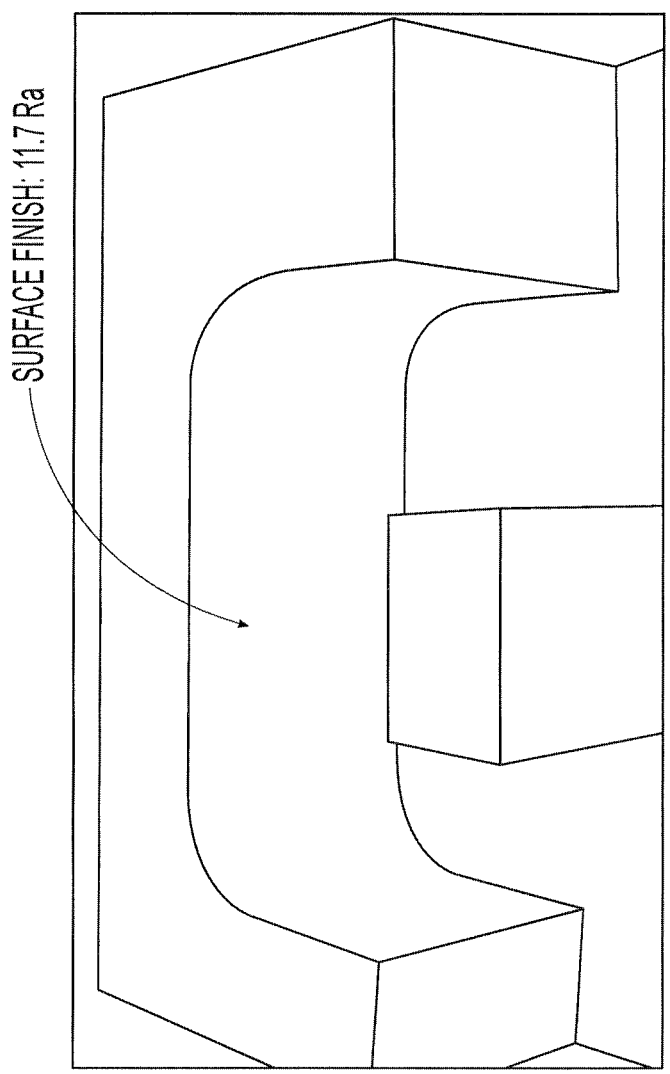
FIG. 19 is a picture showing an actual cut made using a rotary cutting tool in accordance with one embodiment of the present invention.
Figure 20:
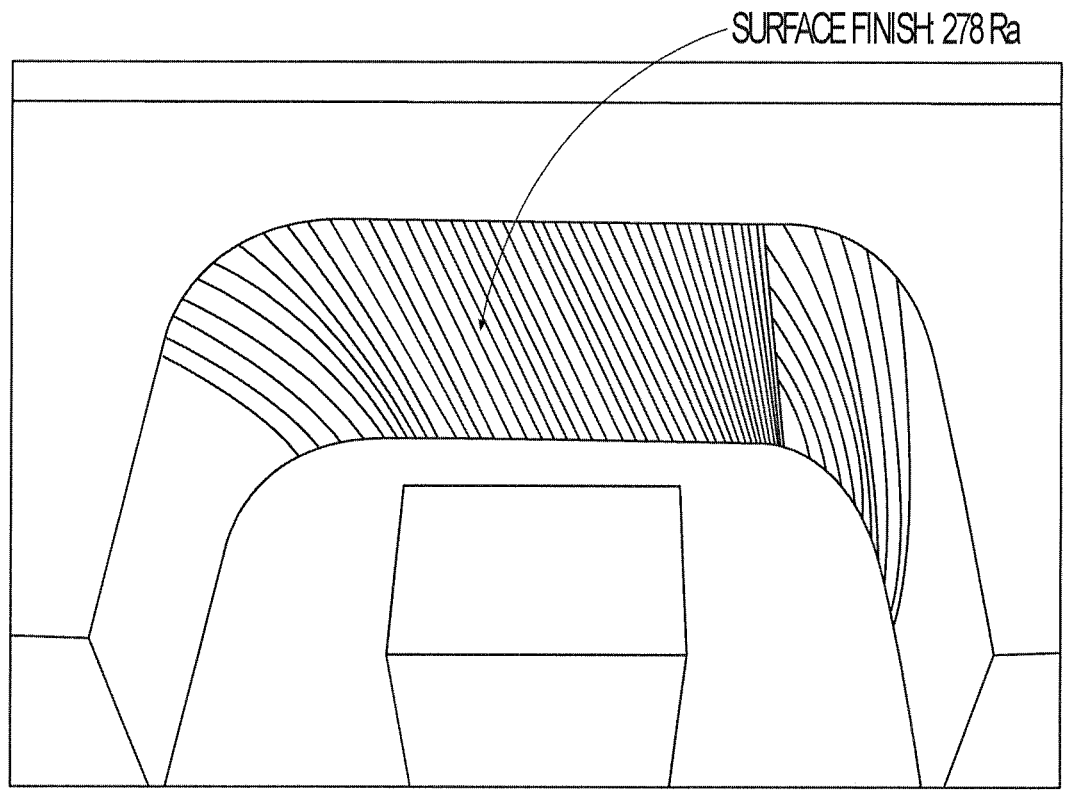
FIG. 20 is a picture showing an actual cut made using a prior art end mill made in accordance with U.S. Pat. No. 6,997,651.

An additional surface finish comparison of the tools was conducted wherein, the end mills were used to cut a double pocket in a 4"×4"×10" block of 4140 steel having a hardness of 28 HRc. Pictures of the machined surfaces for each tool are shown in FIGS. 18-20. The double pocket machining showed an even larger difference than the straight slotting operation. The surface finish of the end mill of U.S. Pat. No. 6,997,651 produced a surface finish of 278 Ra that was over 23 times rougher than the surface finish of 11.7 Ra provided by the end mill of the present invention. The prior art Z-Carb® end mill produced a surface finish of 109 Ra that was over 9 times rougher than the end mill of the present invention.

Figure 21:
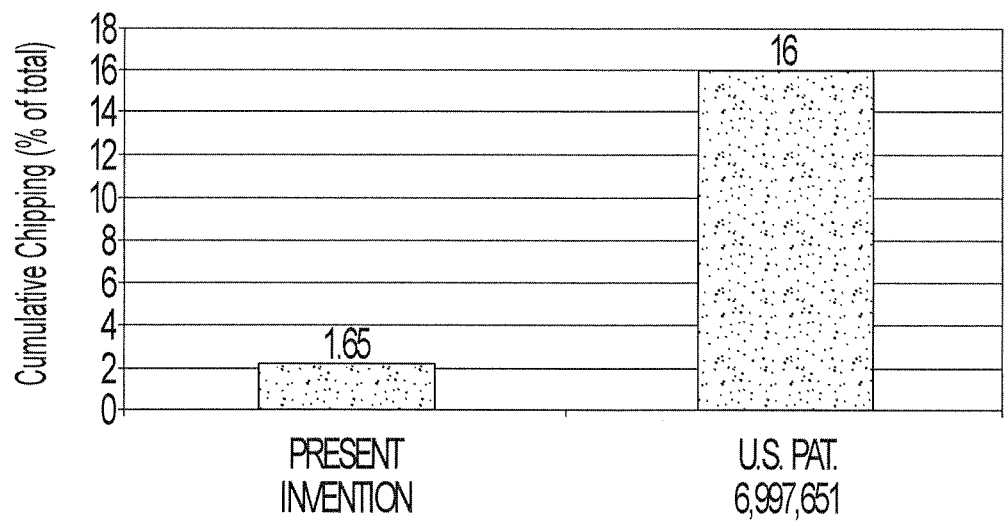
FIG. 21 is a chart showing a comparison of the edge chipping measurements of the tools of FIGS. 18-19.

Another advantage of the end mill of the present invention over the end mill of U.S. Pat. No. 6,997,651 with regard to edge chipping is shown in the graph of FIG. 21. The end mills were used to cut a 0.5 inch deep slot in 4140 steel having a hardness of 28 HRc at a rotational speed of 2675 rpm for 700 inches total at a feed rate of 25 inches per minute. The results show that the edge chipping of the end mill of U.S. Pat. No. 6,997,651 was over nine times greater than the edge chipping of the end mill of the present invention.

In conclusion, the prior art end mill of U.S. Pat. No. 6,997,651 has a plurality of flutes all having the same helix angle and being equally spaced about the circumference of the tool (same index angle), but having at least two different radial rake angles and at least two different axial rake angles. The prior art Z-Carb® end mill having a plurality of paired helical flutes forming an even number of helical peripheral cutting edges equally spaced circumferentially in one plane wherein the peripheral cutting edges are formed as a plurality of pairs of diametrically opposite cutting edges having the same helix angle and thereby being symmetrical with respect to the axis of the body. These prior art end mills are believed to be the two closest prior art references. In a simplistic sense, the present invention is a combination of selected features of the prior art end mill of U.S. Pat. No. 6,997,651 and the prior art Z-Carb® end mill in that embodiments of the present invention include an end mill combining diametrically opposed pairs of radial rake angle and diametrically opposed pairs of unequal helix angles.

The test results obtained with the prior art end mill of U.S. Pat. No. 6,997,651 are poor when compared to the prior art Z-Carb® end mill. The prior art end mill testing would seem to suggest that changing the radial rake angle of two diametrically opposite pairs of rake angles (as in prior art end mill of U.S. Pat. No. 6,997,651) would not provide any benefit if combined with diametrically opposed pairs of unequal helix angles (as in the prior art Z-Carb® end mill) and indeed would likely result in a decrease in performance.

The test data presented herein shows that the end mill of the present invention provides a significant improvement over the prior art and mills, and specifically the Z-Carb® end mill and the end mill of U.S. Pat. No. 6,997,651. The results of the testing using the end mill of the present invention are certainly unexpected when looking at the individual test results of the Z-Carb® end mill and the end mill of U.S. Pat. No. 6,997,651. It is also noted that improvement in end mill performance are typically measured in percent improvement and that a 20 to 25% improvement is a significant gain, whereas the improvement in the test results of the present invention herein are much larger.

There is shown in FIGS. 22 and 23 portions of rotary cutting tools according to different embodiments without a gash blend. Similar tools, except according to embodiments with a gash blends, are shown in FIGS. 24 and 25 respectively.

Figures 26, 27, 28:
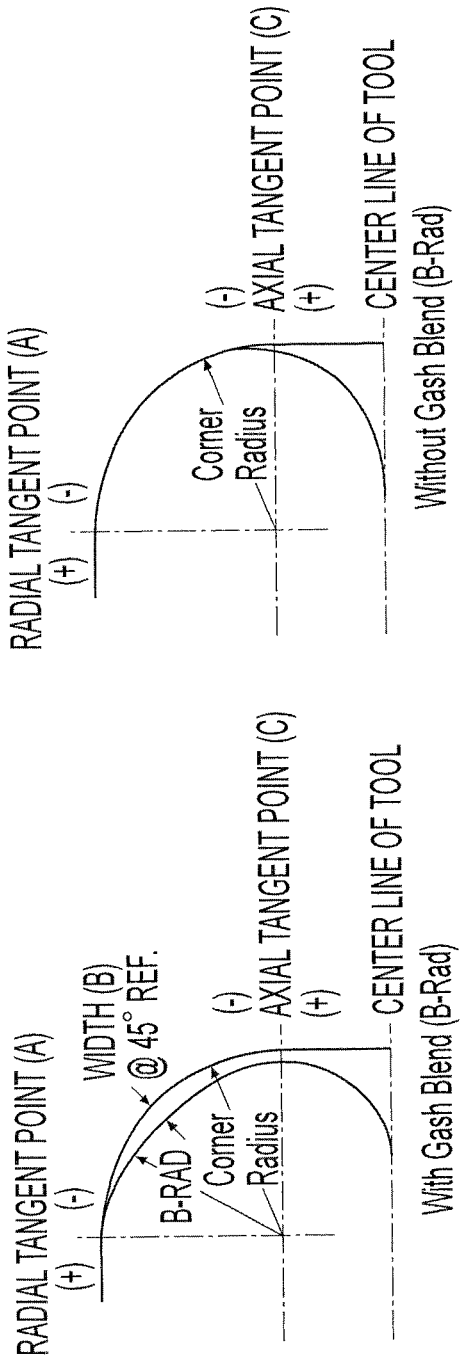
FIG. 26 is a schematical representation of a portion of a rotary cutting tool according to an embodiment without a gash blend.
FIG. 27 is a schematical representation of a portion of a rotary cutting tool according to an embodiment with a gash blend.
FIG. 28 is a table, with reference to FIG. 27, exemplifying dimensions of a gash blend for a variety of rotary cutting tools according to several embodiments.

There is shown in FIG. 26 a schematical representation of a portion of a rotary cutting tool according to an embodiment without a gash blend and there is shown in FIG. 27 a schematical representation of a portion of a rotary cutting tool according to an embodiment with a gash blend.

There is illustrated in FIG. 28 a table, with reference to FIG. 27, exemplifying dimensions, in inches, of a gash blend for a variety of rotary cutting tools according to several embodiments. With regards to the measurements in FIG. 28 and the diagram in FIG. 27, the gash blend is disposed between a corner radius and blend radius, i.e. B-RAD, and extends generally from an axial tangent point C toward a radial tangent point A. A width of the gash blend is referenced at 45 degrees between the axial tangent point C and the radial tangent point A. It must be understood that the examples shown in FIG. 28 are made with reference to a particular combinations of cutting diameter and corner radii and merely illustrate a variety of examples within a variety of different embodiments.

In one embodiment, a tool may have a gash blend with a width referenced at 45 degrees between an axial tangent point and a radial tangent point that is between 0.5% and 15.0% of the cutting diameter of the tool. In another embodiment, a tool may have a gash blend with a depth or thickness referenced at 45 degrees between an axial tangent point and a radial tangent point that is between 10% and 50% of the corner radius.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A method of forming a rotary cutting tool comprising:
providing a body having a cutting portion and a shank portion; a plurality of diametrically-opposed helical flutes formed in the cutting portion of the body, where adjacent helical flutes form an index angle therebetween in each radial plane along the axial length of the flutes; and a plurality of peripheral cutting edges formed along an intersection of a circumferential surface of the cutting portion of the body and a portion of an inner surface of a respective one of the helical flutes facing in a direction of rotation of the body, each peripheral cutting edge having a radial rake angle;
forming the index angle between at least two adjacent helical flutes different from the index angle between at least one other pair of adjacent helical flutes in at least one of the radial planes;
forming the radial rake angle of at least one peripheral cutting edge different from the radial rake angle of another peripheral cutting edge of a different helical flute; and
forming a blended gash from an axial tangent point toward a radial tangent point.

2. The method of claim 1, wherein the blended gash extends from the axial tangent point at least to a point 45 degrees between the axial tangent point and the radial tangent point.

3. The method of claim 2, wherein the blended gash has a width between 0.002 and 0.030 inches at the point 5 degrees between the axial tangent point and the radial tangent point.

4. The method of claim 2, wherein the blended gash has a width between 0.020 and 0.026 inches at the point 5 degrees between the axial tangent point and the radial tangent point.

5. The method of claim 2, wherein the blended gash has a width between 0.007 and 0.015 inches at the point 5 degrees between the axial tangent point and the radial tangent point.

6. The method of claim 2, wherein the blended gash has a width between 0.5% and 15.0% of a cutting diameter of the tool at the point 45 degrees between the axial tangent point and the radial tangent point.

7. The method of claim 2, wherein the blended gash has a width between 10% and 50% of a corner radius of the tool at the point 45 degrees between the axial tangent point and the radial tangent point.

8. The method of claim 1, wherein one of the radial rake angles is at least seven degrees positive.

9. The method of claim 1, wherein one of the radial rake angles is at least three degrees less than an other of the radial rake angles.

10. The method of claim 1, wherein one of the radial rake angles is at least seven degrees positive and an other of the radial rake angles is at least three degrees less than the one.

11. A rotary cutting tool comprising:
a body having a cutting portion and a shank portion;
a plurality of diametrically-opposed helical flutes formed in the cutting portion of the body, wherein adjacent helical flutes form an index angle therebetween in each radial plane along the axial length of the flutes,
a plurality of peripheral cutting edges formed along an intersection of a circumferential surface of the cutting portion of the body and a portion of an inner surface of a respective one of the helical flutes facing in a direction of rotation of the body, each peripheral cutting edge having a radial rake angle;
the index angle between at least two adjacent helical flutes being different from the index angle between at least one other pair of adjacent helical flutes in at least one of the radial planes; and
the cutting tool having an a blended gash extending from an axial tangent point toward a radial tangent point.

12. The rotary cutting tool of claim 11, wherein the blended gash extends from the axial tangent point at least to a point 45 degrees between the axial tangent point and the radial tangent point.

13. The rotary cutting tool of claim 12, wherein the blended gash has a width between 0.002 and 0.030 inches at the point 5 degrees between the axial tangent point and the radial tangent point.

14. The rotary cutting tool of claim 12, wherein the blended gash has a width between 0.020 and 0.026 inches at the point 5 degrees between the axial tangent point and the radial tangent point.

15. The rotary cutting tool of claim 12, wherein the blended gash has a width between 0.007 and 0.015 inches at the point 5 degrees between the axial tangent point and the radial tangent point.

16. The rotary cutting tool of claim 12, wherein the blended gash has a width between 0.5% and 15.0% of a cutting diameter of the tool at the point 45 degrees between the axial tangent point and the radial tangent point.

17. The rotary cutting tool of claim 12, wherein the blended gash has a width between 10% and 50% of a corner radius of the tool at the point 45 degrees between the axial tangent point and the radial tangent point.

18. The rotary cutting tool of claim 11, wherein at least one of the radial rake angles is at least seven degrees positive.

19. The rotary cutting tool of claim 11, wherein one of the radial rake angles is at least three degrees less than an other of the radial rake angles.

20. The rotary cutting tool of claim 11, wherein one of the radial rake angles is at least seven degrees positive and an other of the radial rake angles is at least three degrees less than the one.

* * * * *